(12) United States Patent
Dunlop et al.

(10) Patent No.: US 7,254,387 B2
(45) Date of Patent: Aug. 7, 2007

(54) MANAGEMENT AND CONTROL OF TELECOMMUNICATION SERVICES DELIVERY

(75) Inventors: John Dunlop, Glasgow (GB); James M Irvine, Troon (GB); Demessie Girma, Glasgow (GB); Oscar Lazaro, Bizkaia (ES)

(73) Assignee: University of Strathclyde, Glasgow (GB)

( * ) Notice: Subject to any disclaimer, the term of this patent is extended or adjusted under 35 U.S.C. 154(b) by 122 days.

(21) Appl. No.: 10/852,306

(22) Filed: May 24, 2004

(65) Prior Publication Data

US 2005/0021598 A1    Jan. 27, 2005

(30) Foreign Application Priority Data

May 24, 2003    (GB) ................................. 0312009.4

(51) Int. Cl.
*H04M 3/00*    (2006.01)
*H04M 3/16*    (2006.01)
*G06F 15/16*    (2006.01)
*G06F 15/173*    (2006.01)
*G04F 3/00*    (2006.01)

(52) U.S. Cl. ...................... 455/418; 455/411; 709/202; 709/226; 719/316

(58) Field of Classification Search ............. 455/414.1, 455/432.3, 418, 411; 709/202, 226; 719/316
See application file for complete search history.

(56) References Cited

U.S. PATENT DOCUMENTS

| | | | | |
|---|---|---|---|---|
| 5,528,677 | A | * | 6/1996 | Butler et al. ................ 379/196 |
| 5,862,480 | A | * | 1/1999 | Wild et al. ............... 455/432.2 |
| 6,049,712 | A | * | 4/2000 | Wallinder ................... 455/410 |
| 6,330,586 | B1 | * | 12/2001 | Yates et al. ................. 709/201 |
| 6,964,050 | B1 | * | 11/2005 | Do ............................. 719/316 |
| 6,990,670 | B1 | * | 1/2006 | Hodjat ....................... 719/317 |
| 7,152,100 | B2 | * | 12/2006 | Thomas et al. ............. 709/220 |

FOREIGN PATENT DOCUMENTS

| | | |
|---|---|---|
| EP | 1 416 747 A1 | 5/2004 |
| WO | WO 96/25012 | 8/1996 |
| WO | WO 01/80589 A1 | 10/2001 |
| WO | WO 02/15598 A1 | 2/2002 |
| WO | WO 03/007628 A1 | 1/2003 |

OTHER PUBLICATIONS

Search Report, dated Oct. 29, 2004.

* cited by examiner

*Primary Examiner*—William Trost
*Assistant Examiner*—Ariel Balaoing
(74) *Attorney, Agent, or Firm*—Alston & Bird LLP

(57) ABSTRACT

The present invention relates to a telecommunications service provision manager that is configured to allow access to a plurality of telecommunications services to determine the location of a service and control execution of that service.

15 Claims, 7 Drawing Sheets

MANAGEMENT AND CONTROL OF TELECOMMUNICATION SERVICES DELIVERY

BACKGROUND OF THE INVENTION

1. Field of the Invention

The present invention relates to a system and method for managing and controlling the delivery of telecommunication services and, in particular, managing and controlling service delivery over a number of wireless communication access technologies and systems.

2. Description of Related Art

Current wireless communication systems are characterized by the availability of a number of transport technologies, for example Wireless LAN, Bluetooth, 2G networks, which allow the provision of various services with distinct features to the subscriber. The emergence of new networks such as 3G and 4G networks will lead to a situation where a network operator will have to manage an increased number of different networks. Simultaneously, the provision of personalised services is expected to fuel the operation of wireless networks over the near future, thereby enabling the user more flexible and meaningful access to content. However, network planning and management is currently performed in a monolithic fashion, so that service provision over each individual system is dealt with relatively independently. This approach limits the reusability of particular service module implementations as they are highly coupled with the specific technologies employed to deliver them. Consequently, the time to market cycles of new services are significantly increased.

Mobile communication systems are characterised by their ability to provide a number of services while "on the move". The deployment of 3G and 4G systems allows the introduction of new services, which could not be supported by previous wireless system generations. Within current telecommunication systems the end-to-end quality of service that can be delivered to the user is closely related to the ability of the system to fulfil simultaneously a particular set of service level agreements. These agreements are usually signed off-line among network operators for a variety of traffic classes. The ability of each network operator to fulfil their service level agreements is influenced by the specific network management strategies implemented within each network domain.

A problem with current systems is that they do not facilitate the realisation of a coordinated management strategy, which would allow interaction among different transport networks operated by a network operator for a more efficient fulfilment of the service level agreements signed. In fact, as the diversity of the network infrastructures operated by individual network operators and number of services provided increases, so does the variability in behaviour of the system, making it increasingly difficult to quantify accurately the optimum terms in which service level agreements need to be signed.

To account for increased system dynamism, one existing solution is the Mobile Station Application Execution Environment MExE, defined originally by ETSI but now coordinated by the $3^{rd}$ Generation Partnership Project. Details of this are given in the articles 3G TS 22.057 V4.0.0 "Mobile Execution Environment (MexE); Service description Stage 1" and 3G TS 23.057 V4.0.0 "Mobile Execution Environment (MexE); Functional description, Stage 2" $3^{rd}$ Generation Partnership Project. MExE provides a standardised execution environment in a Mobile Station (MS) allowing not only the development of applications independently of any specific MS platform but also the negotiation of the supported capabilities with the MExE service provider. However, the management functionality of MExE is very limited.

In order to increase service customisation or personalisation, architectures such as CAMEL have been designed. Details of this are described in GSM 02.78 "Digital Cellular Communication System (Phase 2+); Customized Applications for Mobile Network Enhanced Logic (CAMEL): Service Definition". Service customisation is performed by network operators, which by means of service switching functions are able to adapt particular service features to the user's requirements. CAMEL therefore provides a certain degree of service customisation, which is performed by the network operator. However, in such systems, the user is constrained to access a set of services highly coupled with the transmission technology employed and the particular network operator is responsible for delivering the service.

The advent of distributed object technology and the availability of Application Programming Interfaces (APIs) facilitates the definition of open models, such as the Open Service Access (OSA), for service provisioning and inter-working across multiple access technologies—see FIG. 1 and 3G TS 23.127 "Virtual Home Environment/Open Service Access" $3^{rd}$ Generation Partnership Project. OSA relies on a framework server and an associated API to enable services to discover exposed network functionality. However, OSA does not include any support for execution environments as part of the framework and relies on APIs to enable third party services providers access to particular service capability features provided by each network.

The OSA promotes a view of mobile communication systems where clear decoupling exists between service provider servers running the service logic and the network elements under the network operator control. This perception of mobile communication systems combined with new middleware technologies such as software agents and brokering capabilities, as proposed in "D1.1, Mobile Middleware—Architectural and Functional Specification, Performance Metrics, Part 2", Mobile VCE Core 2, October 2000, presents the opportunity to evolve current systems for increasing service personalisation, enriching the pool of services available to mobile users and developing more dynamic business models. However, the efficient management of a system with such degree of variability, personalisation and dynamism still remains a difficult task.

BRIEF SUMMARY OF THE INVENTION

An object of the present invention is to provide a framework for the management and control of service delivery over a number of communication systems and in particular, wireless communication access technologies and systems.

According to a first aspect of the present invention, there is provided a service provision manager for allowing access to a plurality of services, the manager being configured to determine the location of a service and control execution of that service. The service provision manager may operable to control various different agents, and may be an agent-based system. Preferably, the manager has a first agent access area for controlling access to the plurality of services; an agent location and control area for determining the location of an agent for providing a selected one of the services; and an agent execution area for controlling the execution of the selected service agent. Agents are discrete pieces of software that can roam between two or more processors and act in a relatively autonomous manner to solve particular problems. Whilst agents provide many advantages, service providers have traditionally been uncomfortable with operational scenarios whereby agents acting on behalf of third parties are allowed to enter their systems. However, by providing an agent execution area in the service provision manager, and controlling the execution of selected agents within this area, these concerns can be overcome.

Preferably, the service provision manager is operable to allow the determination of a preferred network via which the selected service is to be provided.

Preferably, the service provision manager is configured to define individual service environments based on network access technology features and/or network policies and/or service features supported. By individual service environment, it is meant a dynamically generated environment in which the users can receive services in a preferred manner depending on the capabilities of their terminal, i.e. their mobile telephone or lap-top etc., and/or subscription restrictions.

Preferably, individual service environments are created from communities of network and service agents, which agree on the particular terms in which they will co-operate to provide particular features of specific services. The system may be configured to allow users to join the community or communities, which provide the closest service to their preferred one and determine the network transport infrastructure and service provider on the fly. In practice, the system is configured to allow the potential teams of networks and service agents to be continuously created and/or up-dated.

Providing individual service environments allows the creation of service environments comprising services with specific features provided by a set of service providers and supported by a number of transport technologies represented by various network operators. Preferably, the system is configured to provide a mechanism for real-time signing of service level agreements among a network operator, a service provider and the user. The system is also configured to allow users to select the individual service environment that suits best their preferences and context, and the most convenient service provider and network operator in terms of quality of service guarantees and/or cost. It also allows for more effective negotiation among users, service providers and network operators, because implicit links are created between them as individual service environments are established. In this context, by user it is meant the user or an agent acting on behalf of the user.

The service provision manager may further comprise a service regulation manager for managing/monitoring network operator and service provider profiles. The service regulation manager may be operable to define the terms and conditions under which network operators will co-operate with specific service providers to provide value added services that rely on the availability of some sort of network information. This means that individual entities providing the service can be abstracted into a set of rules required to access network information. The service manager may be operable to control access to strategic network information within the context of service creation policies. The service manager may be operable to continuously evaluate the correctness of the service execution.

Preferably, the user is represented by a context agent associated with the user terminal and a user agent located within the service provision manager. The context agent may be operable to identify the user and provide an indication of the services requested. Other more complex or detailed information may be associated with or included in the user agent. For example, the user agent may include or have access to details such as the type and nature of the user terminal, the service provider and network operator to which the user subscribes, if any, and the quality of service that the user has access to. The user agent acts on behalf of the user in response to a command from the context agent. By keeping the amount of information associated with the context agent to a minimum and instead including this in the user agent, this allows for a more efficient execution of user related computations, with the associated saving in battery power and increased functionality available to the user. It also improves service negotiation under adverse wireless link conditions based on limited service requirements information and various profiles stored in the network. Furthermore, it reduces the maintenance burden of personalised services, even when the user is roaming between network operators, with the same level of flexibility and adaptability as in the user's home network.

BRIEF DESCRIPTION OF THE SEVERAL VIEWS OF THE DRAWING(S)

Various aspects of the invention will now be described by way of example only and with reference to the accompanying drawings, of which:

DETAILED DESCRIPTION OF THE INVENTION

The present invention is a framework or platform, which will be referred to as a service provision manager or controller, for allowing a user to access a plurality of different services. The platform provides an environment where users, service providers and network operators can interact in order to optimise the provision of services to the user. Management functionality is provided for establishing the dynamic relationships between the parties each time a communication session is initiated, so that the user can be provided with a personalised service across a wide range of network operators and service providers.

Figure 1:
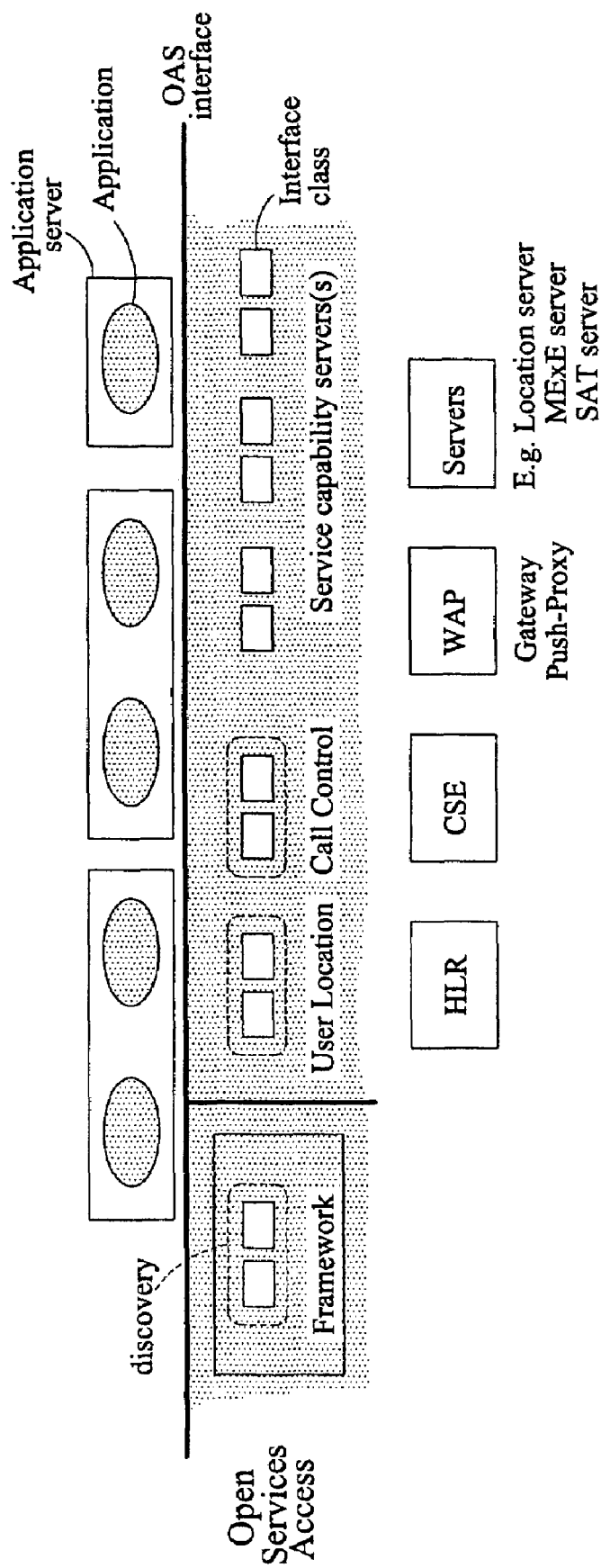
FIG. 1 is a diagram of an Open Service Access (OCA) framework.
Figure 2:
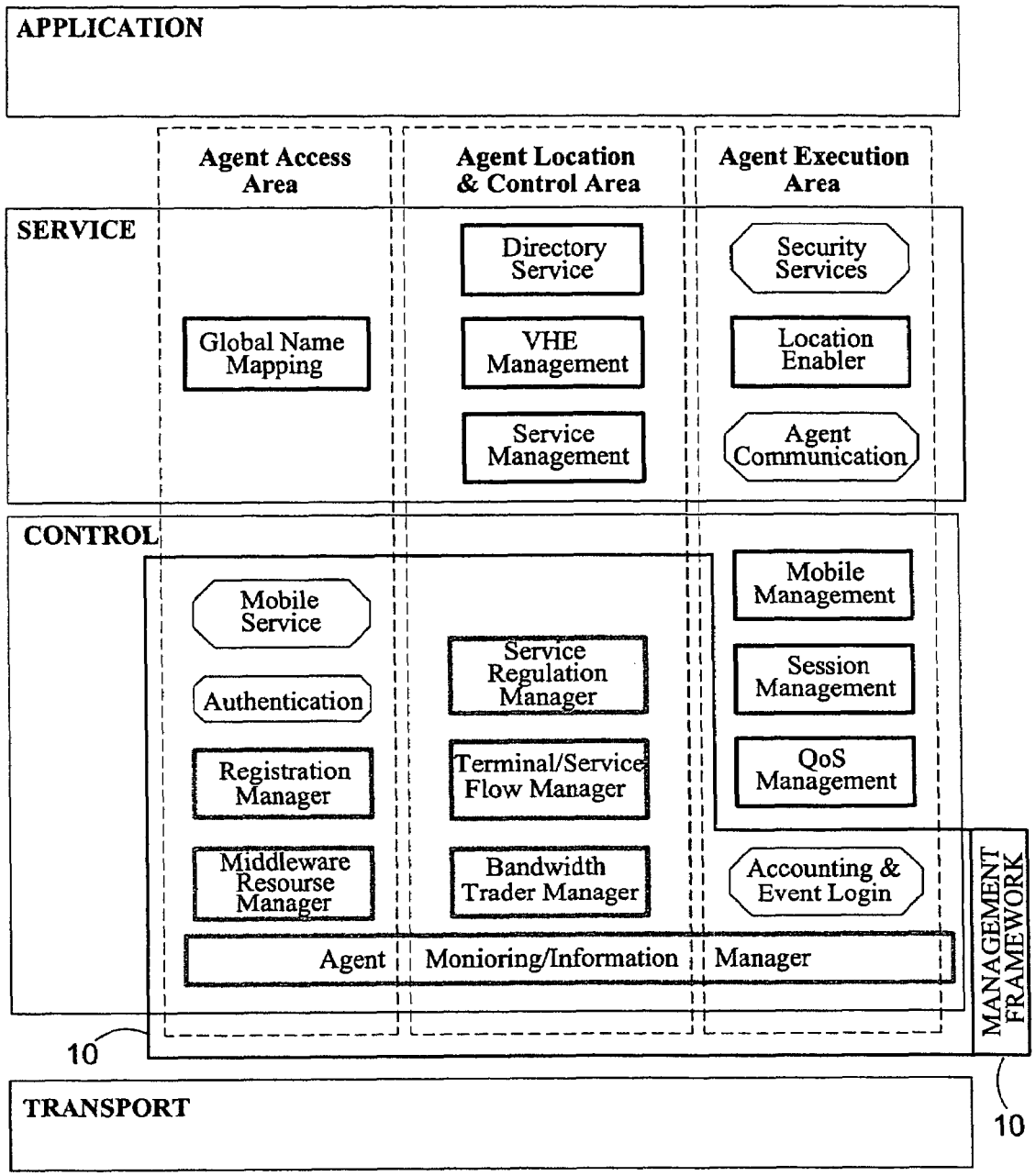
FIG. 2 is a schematic representation of a communications management framework.

FIG. 2 shows the overall management framework structure 10, which has various control entities, and is operable to interact with various services and control functions. The management framework platform 10 is outlined in bold in FIG. 2. This structure is provided between the application layer, which includes a plurality of different services that may be provided by the network provider or may be made available from one of more independent service providers, and a transport layer, which is provided by one or more network operators. Within the platform users are represented by user agents, service providers are represented by service agents and network operators are represented by network agents. These agents are able to pass through the framework of FIG. 2 and are controlled by the various management entities. In general, however, agents are not stored at specific points within the framework, but instead are stored in dedicated storage areas separate therefrom. In particular, the user agents are provided in a user agent storage area (not shown).

Each agent includes information that can uniquely identify it, as well as details of functionality and requirements, such as the communication protocols and languages that it needs in order to execute and/or interact with other agents. The service and network agents can be provided by the service provider and the network operator respectively. However, for each user a unique user agent has to be created by an authorised party. This can be done in various ways, for example when the management platform is provided by a network operator, typically the user agents would be created and provided from the user's home network. Alternatively, where the platform is provided by an independent party, so that there is an open management scenario, typically creation of the user agents would be facilitated by the platform provider. In any case, an appropriate user agent is generated, reflecting the capabilities of the user terminal and operable to negotiate on behalf of the user within the management platform structure.

The service manager 10 has a modular architecture comprising three distinct areas, which provide various management functions for mobile distributed entities. This could be implemented as a stand-alone server solution or as a distributed architecture. The three areas are an Agent Access Area, an Agent Location and Control Area, and an Agent Execution Area. Each of these has functionality that is able to control movement of agents round the platform, and/or interact with and control services provided by other entities. For example, the control functionality of the agent access area may be operable to interact with and control a global name mapping service provided in the system level architecture (SLA).

The Agent Access Area mainly controls access to resources and services provided by the platform. This area is responsible for the management of the physical resources under the control of the management platform, i.e. computing resources. It is also responsible for the authorisation and determination of access rights for the execution of different distributed entities, e.g. agents. This area manages controlled access to remote resources and execution environments, so that, for instance, execution of particular services can be optimised.

The Agent Access Area includes a mobility service, an authentication service, a registration manager and a middleware resource manager (MRM). It should be noted that although the mobility service, the authentication service and the registration manager are shown separately from the middleware resource manager, typically they are provided within it.

The mobility service in the agent access area is provided to control agent mobility between different service management platforms. The authentication service acts as a gateway to any agent trying to access the platform, and is operable to authenticate all agents that try to do so. To this end, each agent may include a certificate or identifier that can identify its origin or source. Only agents that are from recognised sources are allowed access, for example, agents that have originated from service providers or network operators that have signed up to use the service platform. In the event that an agent is not properly authenticated, access to the platform is prevented.

The registration manager is provided to identify and monitor agents that are currently active in the platform and their expected behaviour. To this end, the agent registration manager is operable to register agents that wish to participate on the platform, after those agents have firstly been authenticated. Hence, all agents wishing to participate in any activity on the platform, including all user, service and network agents, have to firstly register with the agent registration manager or module in the agent access area. The middleware resource manager is operable to ensure that enough resources are available to the agent to allow it to execute. This will be described in more detail later.

The Agent Location and Control Area is the second area of the management structure. It is mainly concerned with the discovery, location and control of services provided and advertised. The functions located within this area assist the agents to discover, locate and/or register services, which may or may not be provided by means of agent technology. This area is also responsible for monitoring the conditions in which the service is delivered. Consequently, this area controls the generation of communities of transport networks and service providers, so that they comply with service management policies.

More specifically, the Agent Location and Control Area includes a Service Regulation Manager (SRM), which is operable to set up policies that are monitored by a service level specification (SLS) monitor, a Terminal/Service Flow Manager (T/SFM) and a Bandwidth Trader Manager (BTM). These will be discussed in more detail later. Each of these managers is able to interact with services that are provided by the SLA entity, such as a directory service, a Virtual Home Environment (VHE) management service and a service management service. The nature of these external services is immaterial to the basic operation of the system.

The Agent Execution Area is the last of the three areas of the basic platform. This provides a secure execution environment where agents can execute, negotiate, and act/react to particular events in the system. The service and network agents may be stored in this area, although they may alternatively or additionally be located elsewhere, provided that they can be accessed and executed in this dedicated execution area. Each platform has one or more execution areas under the control of particular Agent Access, Location and Control areas. These do not necessarily need to be co-located.

The services that can be used by control functionality in the Agent Execution Area could include such services as security services, a location enabler, and agent communication. These services would be provided to agents in the execution environment to make them aware of their location, communicate with other agents or entity, and so on to allow them to carry out whatever function they were designed for. Various control functions may be available to agents within the Agent Execution Area including mobility management, session management, and quality of service management, although these are not part of the basic service management platform. Accounting and event logging functionality is provided. In this case, this is part of the basic platform.

Within the Agent Execution Area, individual service environments (ISE) can be created for a user, where they can receive a service in their preferred manner depending on terminal capabilities and subscription restrictions. This allows users to receive the same service experience, regardless of the service provider, offering service portability across network boundaries and terminals. The nature of the relationship between particular network operators and service providers may vary over time and the access to particular network capabilities therefore needs to be controlled in real-time.

Individual service environments are created from communities of network and service agents, which agree on the particular terms in which they will co-operate to provide particular features of specific services. The users may join the community or communities, which provide the closest service to their preferred one and determine their network transport infrastructure and service provider on the fly. In practice potential teams of networks and service agents are continuously being created. Users do not need to specify to the service and/or network agents the transport technology required from the set supported by the terminals available, but only the service features they are interested in. In the first instance, the service features required by the user will determine the team of service providers and network operators capable of providing the service. From the teams of network and service agents selected those which employ transport technologies supported by the user terminal will comprise the final group from where the user agent selects the most suitable combination. Hence, this process is completed without the necessity of the user specifying the transport technology required to the network and/or service agents.

Figure 3:
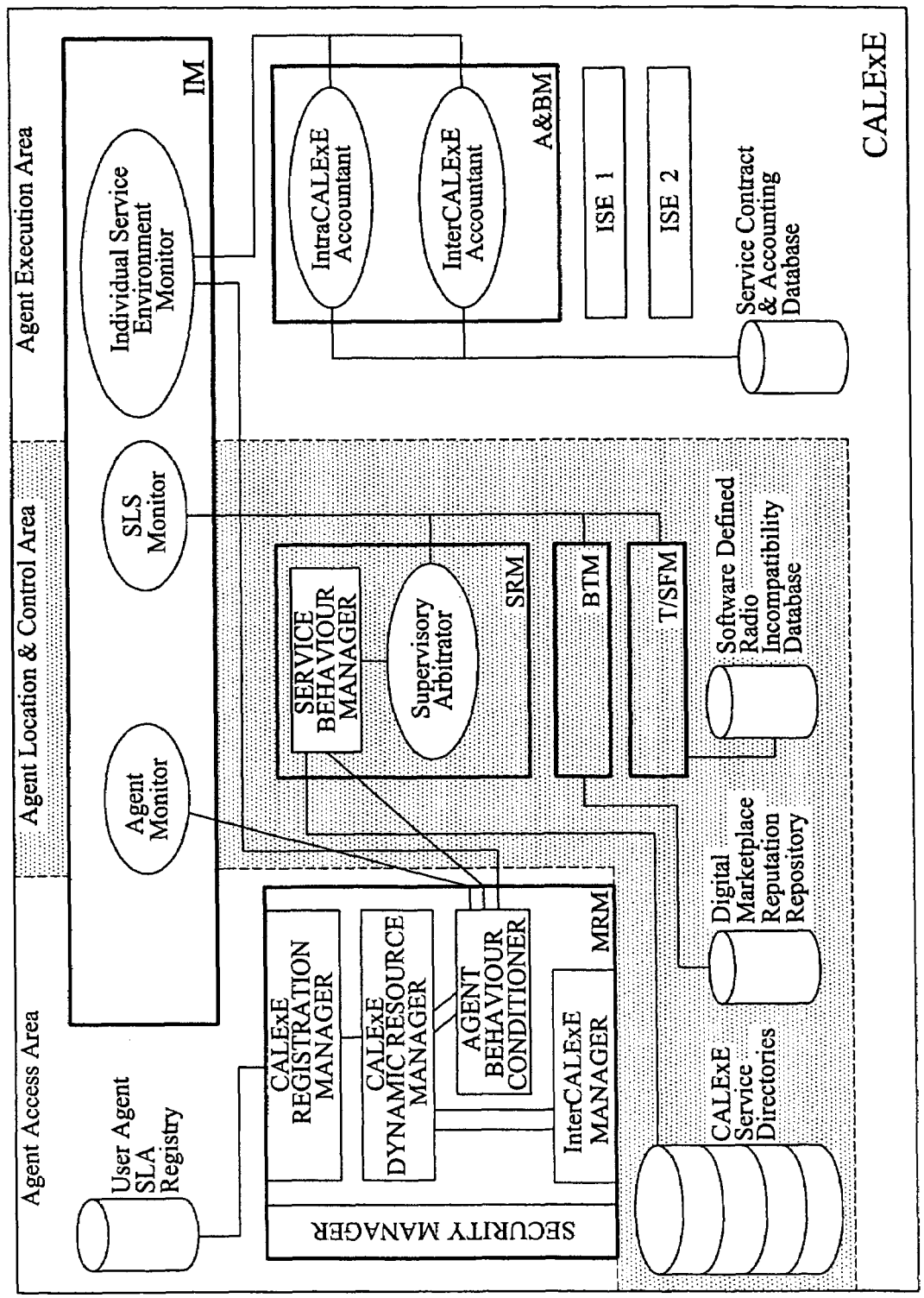
FIG. 3 is a schematic representation of the functional architecture of the framework of FIG. 1.

FIG. 3 shows the functional architecture for the management system of FIG. 2. In the agent access area, the Middleware Resource Manager (MRM) is responsible for the efficient and secure use of the resources within and among various system platforms. It manages not only the access and allocation of computational resources within each individual execution environment, but also it determines, in real-time, the particular location where each service should be executed. Included in the MRM are an inter-platform manager and a security manager, which provide the mobility and authentication services described with reference to FIG. 2. Also included is the registration manager of FIG. 2 for allowing user agents to register with the system. Once a user agent is registered, the registration manager causes details of it to be stored in the user agent register. As will be appreciated, the contents of this register will vary over time as user agents enter and leave the platform. Details that would typically be stored include information regarding the quality of service required, and different aspects of the agent itself. For example, the agent should specify the type of negotiation protocols and communication languages it can use, and actions that have to be performed if the negotiation fails. In order to communicate with the platform based user agent, the user terminal is provided with a context agent. This is operable to connect to the platform, identify the user and provide an indication of the services required.

As described previously, the registration process for user agents is performed in conjunction with the authentication service provided by the MRM security manager. This undertakes authentication to check that agents are valid and have come from a known source, and authorisation, to check what functions the agents are allowed to perform. At a more detailed level, the registration manager is operable to conduct a basic negotiation of particular service level specification parameters (SLS) between the agent and the management system. Ideally, the SLS parameters are standardised so that negotiations can be done relatively quickly. Using the SLS parameters or any other suitable means, the functionality, such as negotiation strategies, that the user agent can implement, can be identified. This information is provided to an agent behaviour conditioner.

Before accepting a new agent into the execution environment, the management system checks whether the operation of this agent in the terms specified by the SLS parameters would affect system performance. To do this, a dynamic resource manager is provided. The dynamic resource manager is operable to determine what negotiation strategies can be implemented by the new agent and which of these can be implemented in the system. A suitable one of the negotiation strategies is then selected, based on information provided in the agent behaviour conditioner. The dynamic resource manager is operable to map particular agent specifications onto physical resources of the environment and to provide directives to other entities, such as the agent behaviour conditioner, in order to accommodate forecasted resource requirements. Once the execution environment is identified, the user agent is notified of its location. In the event that a particular agent cannot be implemented, the dynamic resource manager is operable to generate a signal that indicates that execution is prohibited. This is sent to the agent behaviour conditioner.

The agent behaviour conditioner keeps an up-dated record of the different agent operating conditions and tries to forecast the impact on the system performance or particular agents making use of specific configurations. As noted above, information from the agent behaviour conditioner can be used by the dynamic resource manager to determine whether a particular agent should be allowed access to the system or whether the agent functionality has to be modified in order to gain access.

The agent behaviour conditioner is operable to carry out directives received from the dynamic resource manager. In particular, when a signal is received from the dynamic resource manager indicating that an agent should not be allowed to execute, the conditioner is adapted to force the termination of the agent whose operation represents a threat to the operation of the rest of the agents or to negotiate possible changes in the current agent configuration in order to accommodate a new agent into the system. This negotiation is performed in terms of the SLS parameters negotiated between the agent and the registration manager.

In order to allow performance information to be fed-back, the agent behaviour conditioner is able to communicate with an agent monitor, which monitors the performance of the agents, and an individual service environment monitor, which monitors the performance of groups of agents. Each of the agent or individual service environment monitors is provided in an intra-area information manager (IAIM). The IAIM is responsible for monitoring functionality required by the middleware management platform. This entity collects information from network and service performance. This information is employed by other managers to affect their associated management policies. The IAIM represents the hook between management and wireless communication systems so that relevant information can be exchanged between them.

Once a user agent has registered with the registration manager, the platform allows it to move into the agent location and control area. Within this area is provided a Service Regulation Manager (SRM). The SRM provides management functionality for the services provided by the framework. Included in the SRM is a service behaviour manager (SBM), which is able to communicate with the agent behaviour conditioner in the agent access area. The SBM is responsible for keeping a consistent and up-to-date directory of services that are available, and to this end maintains a service directory. This includes details of the pre-determined teams of services and the transport technologies which operate together, as well as a description of the features of the service and the terms on which they will cooperate (i.e. a Service Level Agreement). The entities in this directory are up-dated by the SBM asynchronously based on the input received from the network and service agents on their policies.

The SRM is operable to ensure that the services that it offers are compliant with whatever features are advertised in the directory. This can be done by interacting with a service agent available on the platform that represents a particular service or via a communication channel to the service provider. This is done by the service behaviour manager (SBM). In the event that the service behaviour manager determines that an agent is not acting within pre-determined parameters, for example is failing to provide the required quality of service, an alarm is raised. In the event that an excessive number of alarms is generated by the service behaviour manager, the SRM is preferably operable to reconsider the suitability for a service to be offered within the execution environment. If a service is deemed to be unsuitable, the SRM can remove it from the service directory, or flag it as being unavailable. As will be appreciated, the interpretation of alarms and the taking of a decision to exclude a service from the platform is a sensitive matter from a security perspective. Because of this, the availability and management of service control information in this area is used to determine the veracity of the alarms. To do this a supervisory arbitrator is provided for checking the integrity of alarms. This arbitrator supervises the behaviour of the services and ensures that services behave as described by the SRM and that the creation and evolution of communities among networks and services follow the policies established by the management framework.

Also provided in the agent location and control area is a Bandwidth Trader Manager (BTM). This has similar functionality as that provided by the SRM, but with respect to the network operators, and not the service providers. This entity supports management of different transportation mechanisms, and is intended to deal mainly with adaptation aspects at a network level. The main responsibility is to maintain an up-dated record of the reputation of each network operator. In particular, the BTM is employed to manage and account reputation repositories, which describe various features of the transportation networks available. The reputation is based on information collected from the network operator, the user and the service provider through a particular session. In the example shown in FIG. 3, the reputation repository is labelled a digital marketplace reputation repository. This can be used when a particular service or network is to be selected using the digital market place described in WO 01/80589.

As well as the BTM, also provided in the agent location and control area is a Terminal/Service Flow Manager (T/SFM). This management entity is associated with the third participant in communication system, i.e. the user terminal. The T/SFM entity assists the terminal operation from the network or even from other terminals. Additionally, if required, it enables user agents to interact with service and network providers as events occur during a particular service provision.

Each of the SRM, BTM and T/SFM in the agent location and control area is able to communicate with an SLS monitor. This entity ensures that services comply with the policies defined by the SRM (i.e. that the service is conforming to the Service Level Agreement) in the Information Manager.

Included in the agent execution area is an Accounting manager. This entity maintains a record of the events that have taken place in the middleware platform during provision of a particular service. Part of this information may be used at a later stage to bill the user for the services provided. The accounting manager is divided into two management functions, the first, the Intra-system accountant, dealing with accounting issues within one system as shown in FIG. 2 and the second, the Inter-system accountant, dealing with accounting issues arising from interactions between the system of FIG. 2 and other like systems. Each of these accounting functions has access to a service contract and accounting database. Also, each of these is able to communicate with the individual service environment monitor in the IM so that the cost of providing services can be monitored to ensure that the amount billed to users is the amount that was set under the terms of the agreement that defines the individual service environment.

Initially, individual services, together with the available network infrastructures that can deliver the services, register with the common agent location and execution environment. Details of these services are stored in the Service Directory of FIG. 3. Each service has associated with it a service agent. Rather than storing the agent in the service directory (although this could be possible), typically, the directory includes a pointer or some other indicator, which identifies the location of the service agent. As well as details of individual services, the service directory also includes details of teams of service and network agents that can provide a pre-determined service. Each of these teams is represented by a service team agent that is operable to negotiate with the user agent in order to determine which team member is able to provide the best service. Once the services are registered, it is not necessary for the agents representing these services to re-register each time they need to access the platform.

Providing the service directory allows services to be located or discovered by the user agent. The registration of the various services and transport technologies facilitates, within the context of ISEs, the signing of real-time service level agreement between services, networks and users. Moreover, the registration process permits the management platform to obtain a profile of the services, conduct various procedures to evaluate the correctness of the service execution and to gather some initial network performance indicators. The registration process may also involve the specification of certain policies with respect to restrictions of service characteristics available that may apply within execution environments with particular features.

One or many execution environments could be attached to the proposed management framework. The level of control, which could be exerted by the agent location and control area over the execution environment, depends on the nature of the entity providing the execution platform. A minimum level of control over the execution environments is however mandatory. For instance, the system controls and manages the creation of communities of services and transport technologies, so that Service Regulation policies are respected and exclusion issues are avoided.

Service Regulation policies are typically defined off-line (i.e. outside the management framework), agreed by the various parties involved. These policies could be specified, at least in part, by a regulator). The Service Regulation policies would be known to agent developers. Adherence to the policies would be controlled by the SRM. Thus, registered services could run locally at a server within the premises of the entity providing the service or in one of the execution environments fully managed and controlled by the system. Services would provide different features depending on the location where the service is executed. It should be noted that although execution environments can be run by different entities and could be located in different domains, the access to those execution environments is controlled by the framework, and therefore execution environment owners cannot enforce the use of services provided therein without the user's consent.

Once a number of services have been registered, users are then able to use the platform to discover suitable services. Users are initially authenticated and registered by the platform. This authentication protocol is independent of other authentication procedures that may be carried out by the networks transporting the user agent to the service manager or controller 10 environment. Once authenticated by the authentication service in the MRM, the user agent searches or interrogates the service directory to identify or discover the services that provide the features they are interested in. Negotiation is initiated to select the most appropriate service provider and transport infrastructure to deliver the service with the desired quality of service commitment within the user's context.

Once the appropriate service is selected, the user is then assigned an agent monitor by the information management system, which reports on relevant events, which could derive from the user agent actions. Based on particular network and service policies, the framework decides, in real-time, the most suitable location to initiate the service execution. The location could change during service execution so that a particular system performance is guaranteed. During service execution, the individual service environment monitor regularly collects data from network and service performance for accounting and billing purposes. Additionally, the agent monitor triggers the relevant managers if some anomaly occurs during execution, e.g. service disruption, break of service contract terms.

Figure 4:
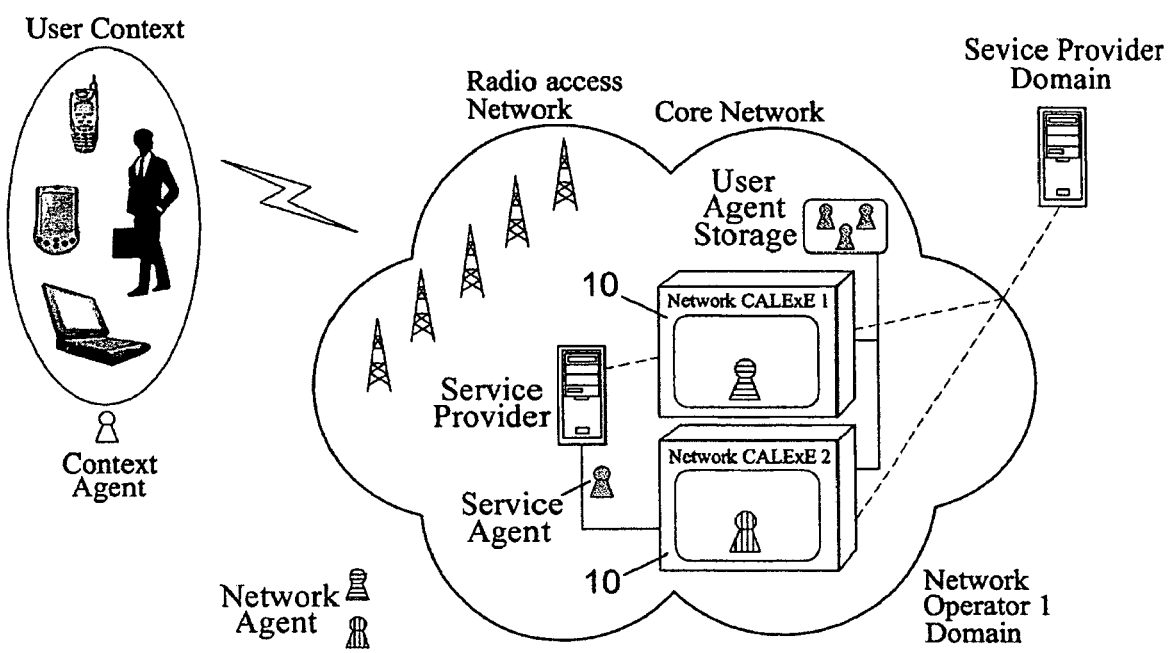
FIG. 4 is a schematic representation of a network operator based management scenario.
Figure 6:
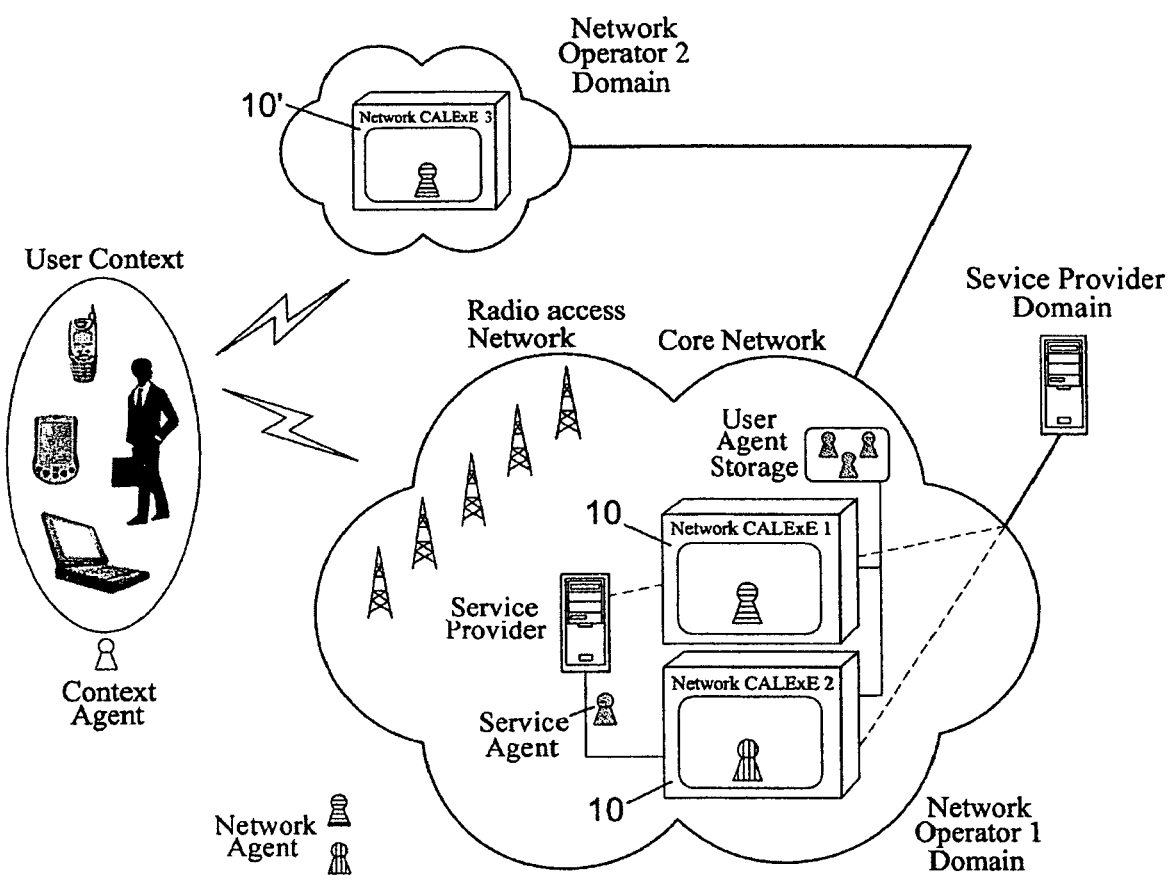
FIG. 6 is a schematic representation of a scenario in which a plurality of network operator domains is used.
Figure 7:
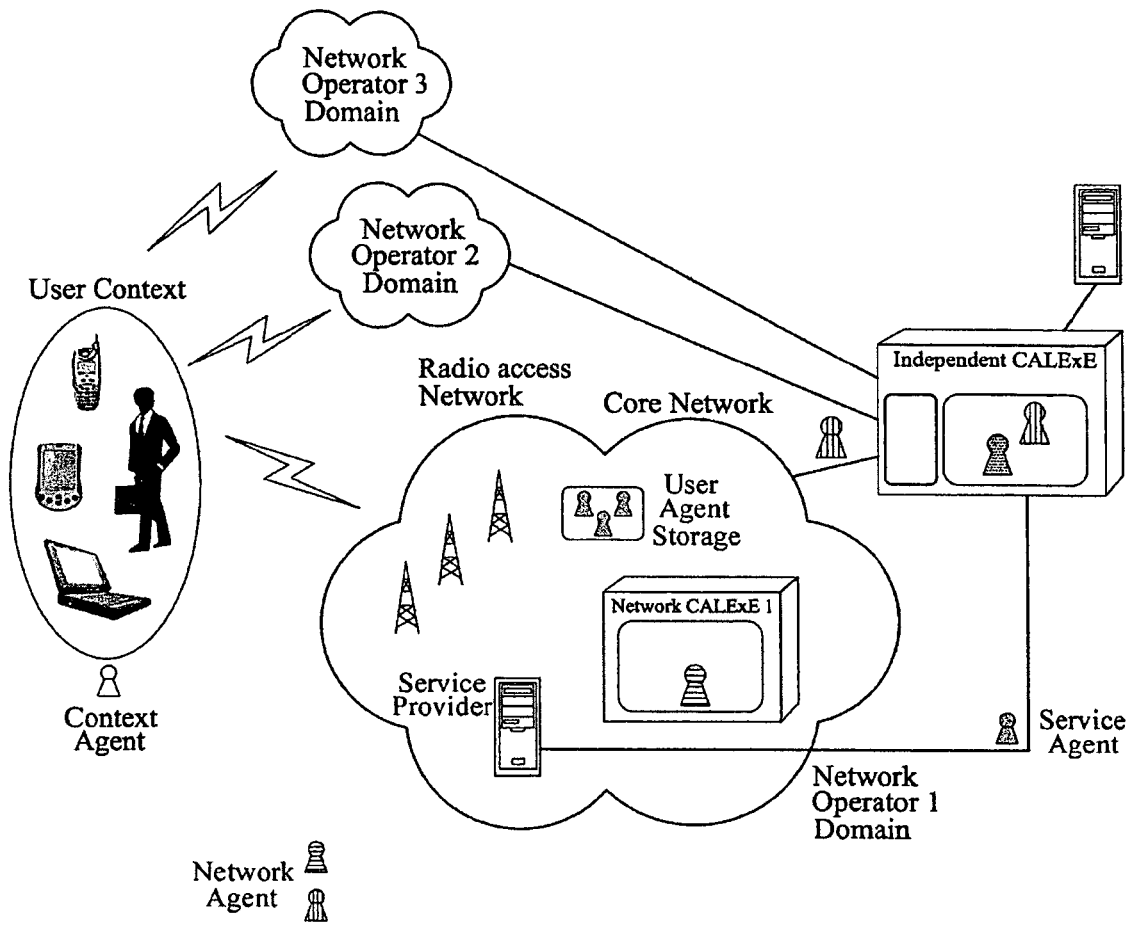
FIG. 7 is a schematic representation of an open market management scenario.

The system of FIGS. 2 and 3 could be employed in a number of alternative configurations and scenarios as depicted in FIGS. 4, 6 and 7, depending on the entity that controls the operation of the management architecture. FIG. 4 shows a scenario where the service manager 10 resides within a network operator domain. Therefore, the network operator controls the operation of the management system. As shown, there are three main entities, which could potentially interact, namely the service provider, the user agent and the network agent. It is worth noting that mobile services can be implemented not only within the network operator domain but also could be provided by third parties outside.

The user presence in the system is distributed in the form of two agents. The first one is the user context agent, which captures information of the user context, e.g. terminals available and associated capabilities, service features, and also interacts with the user. The second agent, i.e. the user agent, resides in the network and it is mainly intended for (re)negotiation of the service. The user agent would typically reside on some form of network-accessible storage, e.g. a server.

The user agent in the network employs previous user information or new context information provided by the user context agent to negotiate the user service. This allows the keeping of detailed and up-to-date user profiles in the network. Thus, the user agent in the network would be able to operate requiring a relatively low exchange rate of information with the context agent. Additionally, as the detailed user profile information and logging of previous operations exist in the network, the context agent would be able to access user information from previous operations without being so severely constrained by the particular capabilities of the terminal. This allows the signalling communication over the radio interface to set-up the service to be reduced, without penalising the user agent negotiating capabilities and the user agent information availability.

The configuration shown in FIG. 4 could be located within the core network of the network operator domain. This would allow the network operator to manage service provision over different radio access technologies, e.g. Wireless LAN, UMTS, Bluetooth, with the same management structure. This is because network agents from every transport technology would co-exist within the framework.

A second aspect depicted by FIG. 4 is the issue of service provision by third party service providers. The proposed framework allows the network operator to define particular execution environments, where networks agents with different capabilities are executed. For instance, a high-class network agent could expose more network capability features than a lower-class network agent. As explained above, this means that individual service environments can be defined and value added services could be realised.

Based, for instance, on the trust between the network operator and third party service provider or the service execution location, the service agents would be allowed to interact with a particular instance of the network agent. Service agents operated by service providers within the network operator domain could benefit from execution in a trusted environment managed by the network operator, thereby allowing the provision of more advanced features and even improved quality of service. Hence, the system provides a mechanism in which the degree of network functionality openness can be determined and controlled. Furthermore, the proposed framework allows a gradual and dynamic increase in network information availability, rather than an abrupt transition.

Figure 5:
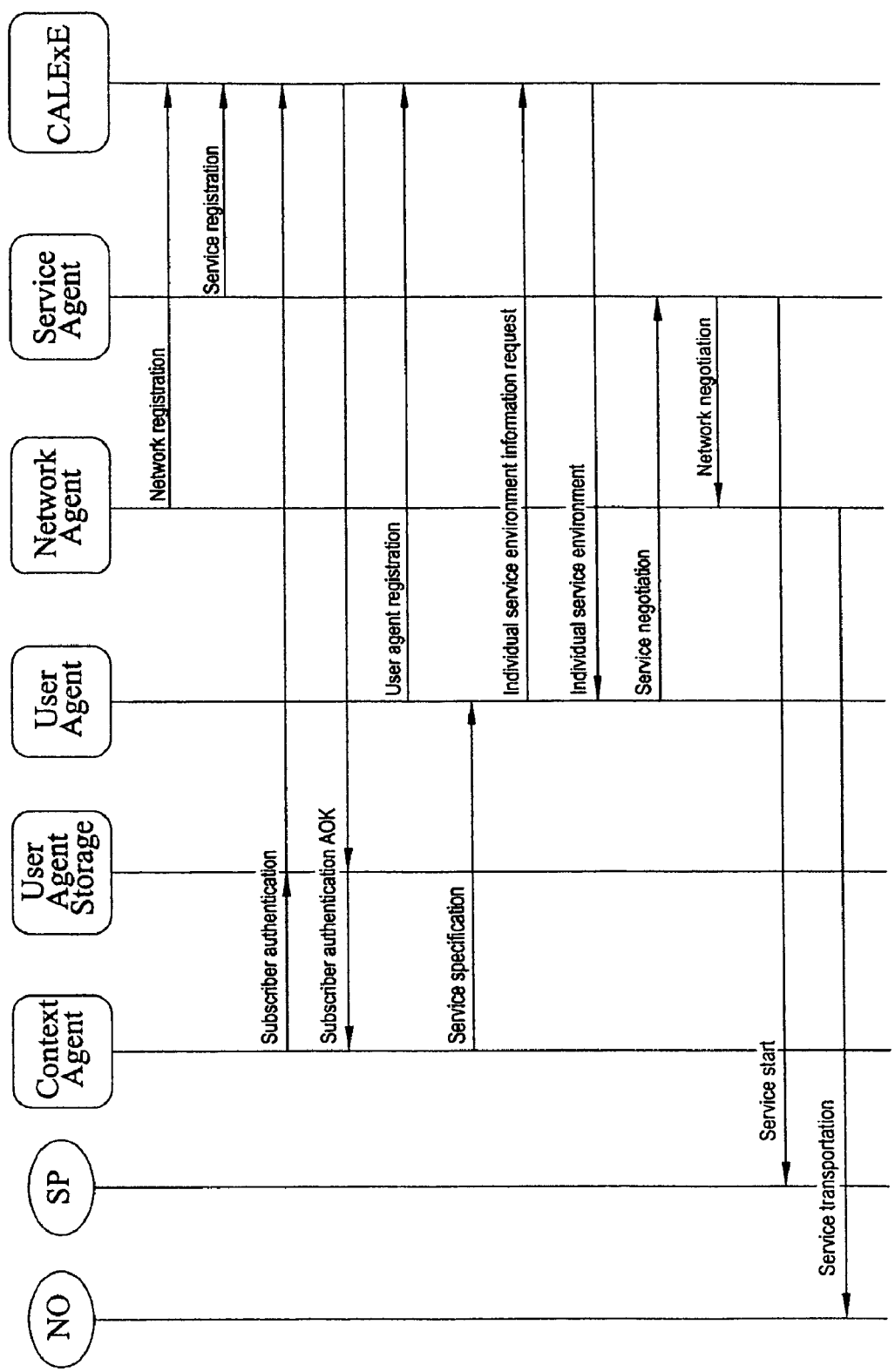
FIG. 5 is a flow diagram of the steps that have to be taken to set up a service in the system of FIG. 4.

FIG. 5 shows a service set-up flow chart based on the arrangement of FIG. 4. From this, it can be seen that the first step is to register the agent that represents the network. To do this, a registration procedure is carried out and then details of the network are stored in the reputation repository of the agent location and control area. As part of this process, the platform Agent Access Area may select an appropriate location for storing the network agent in the local execution environment. Alternatively, the agent provides details of its address and execution environment. The agent location and control area stores the address of the execution environment and the agent address, or for agents resident in the local execution environment, just the local agent address. Once this is done, service agents that represent the services that can be provided by the network are also registered and their details are stored, this time in the service directory in the agent location and control area. Each service agent itself may be stored in a suitable execution environment, which may or may not be in the platform. In any case, details of its location are stored in the service directory.

In order to access the registered services, a user has to be identifiable with the system as an authentic subscriber. This can be done via various different channels, but in any case once a user is registered, a context agent is provided for the user terminal and a user agent is provided to represent the user in the service manager environment. Each time a user wishes to access services on the network, the context agent sends an authentication signal to the user agent, which is located in the user agent storage area. As mentioned before, the user agent storage area can be provided in various places, for example on a server provided by the home network operator or independent platform provider, depending on the scenario. The user agent associated with the context agent is then identified and a signal with this information is sent to the authentication module in the Security Manager in the MRM in the agent access area. The authentication module checks the status of the user agent with whoever provided the agent, for example the home network operator. In the event that the user agent is inactive, access to the system is prohibited. Otherwise, the user agent is authenticated and a signal is returned to the user agent storage area and from there to the user context agent to acknowledge that authentication is completed. After authentication, the user agent is able to register with the system, thereby to indicate that services are required by the user.

It should be noted that this two stage authentication and registration process is done to prevent denial of service attacks, where unauthorised agents could register to attempt to access services, using up resources even while they are being denied access. Authentication to ensure the agent is valid and comes from a known source is required before any services, even registration, are provided.

To register, the user agent sends a signal to Registration Manager. The context agent then creates a message specifying the type of services required by the user. This can be done based on user inputs at their terminal. The signal from the context agent is used by the user agent to generate a request for formation of an individual service environment. The user agent then moves into the SRM in the agent location and control area and interrogates the service directory to find services that meet the criteria set by the user. Once this is done, a team of transport and service agents is selected by the SBM from the service directory, each of these offering either a suitable service or transport mechanism. This team could be dynamically generated in response to the user request or could be one of the pre-determined teams, details of which are stored in the service directory. In either case, an individual service environment is then generated in the execution area after relevant services have been identified from the service directory, and the user agent and a service agent that represents the selected team move into that execution environment. At this stage an individual service environment monitor is created in the information manager to monitor the performance of the ISE.

Once the individual service environment is created, the user agent then negotiates with the service agent that represents all of the services that are available. Once a desired service is selected, the user agent negotiates with the network agent to select the most appropriate network or transport mechanism. This can be determined on criteria set by the user context agent, such as price or quality of service. When negotiations are completed, the service agent sends a signal to the provider of the selected service, thereby to initiate that service. Likewise, the network agent sends a signal to the selected network so that service transportation can start, thereby to provide the service across the selected network to the user. During execution, the SLS monitors the performance of the service as a whole, and sends a report to the supervisory arbitrator in the event that there is a problem. It should be noted that the SLS focuses on overall service execution and does not monitor the agent who may be assisting it the service provision FIG. 6 shows a configuration in which mobile services are delivered while "on the move". Consequently the user is likely to roam networks to receive a particular service in a specific location. As shown in FIG. 6, there is a first network operator domain in which a plurality of service managers 10 is provided. These are able to manage and control access to service providers that are connected to the first network as well as service providers that are external to the network. Also provided is a second network operator domain that has a service manager 10. The manager 10' for the second network is able to communicate with the managers 10 in the first network.

To allow the user to roam between different networks whilst on the move, roaming agreements, analogous to the ones currently negotiated between operators to allow mobile customers to roam between their networks, are provided to allow the inter-operation of system frameworks 10 and 10' among different network operators. The mechanisms required for the service operation in a visited network are controlled and handled by the Inter-CALExE manager in the MRM architecture depicted in FIG. 3. The migration of the user agent from the home network domain to the visiting network domain allows the service features delivered to the user in the visiting network to be maintained with the same level of flexibility and adaptation available within the home network. As the context agent roams with the user terminal, this agent is capable of capturing the user requirements as in the home network. Thus, the correct interaction of context and user agents, as depicted in FIG. 6, could be ensured in the visiting network.

FIG. 7 shows yet another scenario. This is an open market scenario, where the user would be able to dynamically select the most appropriate service provider and network operator to deliver a particular service. The invention is also intended to cope with the requirements arising from these open environments demanding a high degree of service personalisation. Current mobile communication services are mainly provided by each network operator that delivers the service functionality and facilitates the physical components to realise the communication. The importance of network operators introducing their own services and supporting them everywhere has been manifested through the introduction of CAMEL as part of GSM. In this scenario, the control of the invention is shared between the network operator and an independent entity. The system manager under the network operator control would perform similar management tasks as described above with the services running within its domain. The existence of an independent entity, on the other hand, would allow the user to access services provided by a range of different network providers, not only those within a particular network domain.

The invention could complement and support the operation of the Digital Marketplace described in WO 01/80589. The Digital Marketplace provides the framework for service transport negotiation on call per call basis. The system manager in which the invention is embodied, on the other hand, provides the network and service management framework of the open system facilitating dynamic registration, location and control of services and network operators. The creation of individual service environments with the management structure could lead to a reduction in the number of entities involved in a particular service negotiation in the digital marketplace based on user preferences, network policies and service requirements.

The system manager in which the invention is embodied represents a new middleware functionality that resides between service provider applications and network operator transport infrastructure. It provides management of various execution environments for operations of services developed by independent vendors and developers. Consequently, it allows a wider pool of services to be made available to the user. The potential number of service providers, which could be reached by the user with this type of framework, is likely to grow and increase in variety. Therefore, through the proposed new system manager, small service providers can benefit from service provisioning in localised areas.

The system support for software agent technology strengthens the user capabilities to operate more robustly over varying wireless link conditions. The agent acts on behalf of the user even when link conditions are not adequate as it resides in the network. Additionally, agents are a way of introducing service personalisation and as such, the service manager in which the invention is embodied could support the realisation of—Virtual Home Environment (VHE) concept. Agents are aware of the user preferences and the service manager facilitates those agents with the mechanisms to realise customised services within the user and systems limitations.

A further advantage of the system in which the invention is embodied is that it allows the relationship between particular network operators and service providers to dynamically change, in real-time, to meet the user requirements. Therefore, all users may access their service provider via any network operator. As a consequence, network operators could operate an increased number of services. Moreover, the system allows service providers and network operators to specify the terms and conditions in which they would co-operate to provide a service with particular features. That is, network operators could specify the terms and conditions under which they would make available certain network information. Thus, individual services provided by specific service providers, compliant with the network requirements, could deliver these value-added services. Hence, the system does not impose the complete openness of network functionality, but in turn it provides the means for gradually increasing openness and selectively allowing it, as driven by business strategies and/or regulatory directives. Additionally, provision of access to the system and its services could represent a new means of generating revenue.

The invention provides service management across different transport networks to facilitate user service personalisation. This enables network operators to provide their transport services to a wider range of service providers, while allowing a high degree of service personalisation. In particular, it allows high-level directives to be specified so that terms and conditions for realising value added services based on the availability of certain network information could be specified. The invention provides a practical method in which different degrees of network data or user context information can be made accessible to each service provider in a controlled manner. Thus, the conditions in which particular services with specific features are provided can be clearly determined.

The present invention allows for the management of services across access network technologies facilitating the definition of individual service environments where the delivery of personalised services is controlled in a scalable and efficient manner. The invention allows the determination, in real-time, of how communities of services and transporting infrastructures could be created. Thus, harmonised management strategies can be implemented by the network operators across the transport technologies under their control. The system also allows for a homogeneous management of heterogeneous networks. This means that management strategies can be implemented so that specific access networks cooperate at particular locations, such as hotspots, for example airports, etc. to serve the user with the required quality of service. This can be done by exploiting the overall network capacity available. Furthermore, the invention allows network operators to dynamically determine the network features, which will be exposed to particular services and the conditions/mechanisms required to access them. Finally, the invention allows for the management and control of the service delivery to provide improved performance from user and network perspectives. Hence, the management platform provides the means for signing service level agreements among network operators, service providers and the user in real-time.

A skilled person will appreciate that variations of the disclosed arrangements are possible without departing from the invention. Accordingly, the above description of a specific embodiment is made by way of example only and not for the purposes of limitation. It will be clear to the skilled person that minor modifications may be made without significant changes to the operation described.

The invention claimed is:

1. A telecommunications service provision controller that is configured to control and manage access to a plurality of telecommunications services, which services are provided by agents, wherein said controller has a modular architecture comprising distinct modules having distinct control functions, these modules comprising:
   an agent access module, in which access to the plurality of telecommunications services is controlled;
   an agent location module, in which the location of a service agent for providing a selected one of the services of interest is determined; and
   an agent execution module, in which the execution of the selected service agent is controlled,
   wherein said agent access module deals with security in accessing the plurality of telecommunications services, wherein an agent must first pass through the agent access module when entering the telecommunications service,
   wherein said agent access module comprises an agent behaviour conditioner that works with an agent monitor to control the ongoing actions of agents once the agents move to the agent location or agent execution module, and
   wherein said agent location module allows agents to move between one or more service provision controllers.

2. A controller as claimed in claim 1 that is configured to define individual service environments in which a user agent is able to negotiate with one or more service agents that represent one or more services and/or one or more network agents that represent one or more networks.

3. A controller as claimed in claim 2, wherein the individual service environment is created within the agent execution module.

4. A controller as claimed in claim 1 comprising means for authenticating a user request for a service.

5. A controller as claimed in claim 1 comprising means for monitoring activity.

6. A controller as claimed in claim 1 further comprising a service regulation manager for managing/monitoring network operator and service provider profiles.

7. A controller as claimed in claim 6 wherein the service regulation manager is operable to define the terms and conditions under which network operators co-operate with specific service providers.

8. A controller as claimed in claim 5 that is operable to control access to strategic network information as defined by a service creation policy.

9. A controller as claimed in claim 4 that is operable to continuously evaluate the correctness of the service execution.

10. A controller as claimed in claim 1 wherein a user is represented by a context agent associated with user terminal and a user agent that is operable to interact with the service provision controller.

11. A controller as claimed in claim 1 wherein one or more services are each represented by a service agent.

12. A controller as claimed in claim 1 wherein one or more networks are each represented by a network agent.

13. A user or service or network agent that is operable to interact with the service provision controller as claimed in claim 1.

14. A computer based system for implementing the service controller as claimed in claim 1.

15. A controller as claimed in claim 1 wherein said agent execution module provides an agent execution environment.

* * * * *